United States Patent
Ding et al.

(10) Patent No.: US 9,568,977 B2
(45) Date of Patent: Feb. 14, 2017

(54) CONTEXT SENSING FOR COMPUTING DEVICES

(71) Applicant: INTEL CORPORATION, Santa Clara, CA (US)

(72) Inventors: Ke Ding, Shanghai (CN); Rajasekaran Andiappan, Tampere (FI); Xiaoyong Du, Shanghai (CN); Ke Han, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,821

(22) PCT Filed: Dec. 11, 2012

(86) PCT No.: PCT/CN2012/086328
§ 371 (c)(1),
(2) Date: Jun. 27, 2013

(87) PCT Pub. No.: WO2014/089749
PCT Pub. Date: Jun. 19, 2014

(65) Prior Publication Data
US 2015/0301581 A1 Oct. 22, 2015

(51) Int. Cl.
*G06F 13/12* (2006.01)
*G06F 13/38* (2006.01)
*G06F 1/32* (2006.01)

(52) U.S. Cl.
CPC ............ *G06F 1/3225* (2013.01); *G06F 1/325* (2013.01); *G06F 1/3206* (2013.01); *G06F 1/3275* (2013.01)

(58) Field of Classification Search
None
See application file for complete search history.

(56) References Cited

U.S. PATENT DOCUMENTS 5,309,190 A * 5/1994 Shinohara ............... G03B 5/00
396/55
6,324,477 B1 * 11/2001 Bork ....................... G01V 1/30
702/17

(Continued)

FOREIGN PATENT DOCUMENTS

CN 1882947 A 12/2006
GB 2523208 A 8/2015

(Continued)

OTHER PUBLICATIONS

International Search Report and Written Opinion received for PCT Patent Application No. PCT/CN2012/086328, mailed on Sep. 19, 2013, 10 pages.

(Continued)

*Primary Examiner* — Elias Mamo
(74) *Attorney, Agent, or Firm* — International IP Law Group, P.L.L.C.

(57) ABSTRACT

A method and system for context sensing is described herein. The method includes determining if sensor data obtained via a number of sensors exceed a predetermined threshold. The method also includes increasing a sampling rate of any of the sensors to obtain context data corresponding to a computing device if the sensor data exceed the threshold. The method further includes analyzing the context data to classify a context of the computing device.

18 Claims, 5 Drawing Sheets

(56) References Cited

U.S. PATENT DOCUMENTS

| | | | | |
|---|---|---|---|---|
| 2007/0124474 A1* | 5/2007 | Margulis | ................... | G06F 3/14 |
| | | | | 709/226 |
| 2011/0092164 A1* | 4/2011 | Spanhake | ................ | H04Q 9/00 |
| | | | | 455/67.11 |
| 2011/0154363 A1* | 6/2011 | Karmarkar | ........... | G06Q 10/087 |
| | | | | 719/313 |
| 2011/0298301 A1* | 12/2011 | Wong | .................. | H04L 12/2827 |
| | | | | 307/116 |
| 2013/0332108 A1* | 12/2013 | Patel | ................... | G01C 22/006 |
| | | | | 702/160 |

FOREIGN PATENT DOCUMENTS

| | | |
|---|---|---|
| JP | 2002251234 | 9/2002 |
| JP | 2010066978 | 3/2010 |
| JP | 2012074792 | 4/2012 |
| WO | 2005038696 A1 | 4/2005 |
| WO | 2009150793 A1 | 12/2009 |
| WO | 2012/000186 A1 | 1/2012 |
| WO | 2012000186 A1 | 1/2012 |

OTHER PUBLICATIONS

Preliminary Office received for Korean Patent Appln. No. 2014-70117453, mailed on for Action Korean Patent No. received for PCT Patent Application No. PCT/US2013/070545, dated Mar. 15, 2015, 8 pages. (Korean and English Translations).

* cited by examiner

CONTEXT SENSING FOR COMPUTING DEVICES

TECHNICAL FIELD

The present invention relates generally to context sensing for computing devices. More specifically, the present invention relates to context sensing for mobile computing devices according to a context based trigger mechanism.

BACKGROUND ART

Typical context algorithms are used to provide context information to mobile computing devices. However, such context algorithms rely on nonstop sensing capabilities so that the mobile computing device may always be aware of the latest ambient environment or device status. Having such context algorithms running nonstop on the main host processor of the mobile computing device may consume a large amount of power, causing the battery to drain very quickly.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, context algorithms that run nonstop on the processor of a computing device consume a large amount of power, causing the battery to drain very quickly. Thus, embodiments described herein provide for context sensing based on a context based trigger mechanism. The context based trigger mechanism may allow context sensing to be performed in a manner that is efficient in terms of power consumption. This may be accomplished by only capturing meaningful context data, which may be identified based on trigger intervals relating to the context based trigger mechanism. In various embodiments, a user of the computing device, a programmer or developer of the computing device, or any number of context-aware applications running on the computing device, or any combinations thereof, may specify which context data are meaningful. Thus, meaningful context data may be any context data that have been designated as being of interest, and may vary depending on the specific computing device or specific implementation of the computing device. Moreover, meaningless context data may include any context data that have not been designated as being of interest.

Embodiments described herein also provide a context sensing system including offload engines for performing the context sensing procedure. The offload engines may allow the context sensing procedure to be offloaded from the main processor of the computing device to the context sensing system, reducing the power consumption of the computing device.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
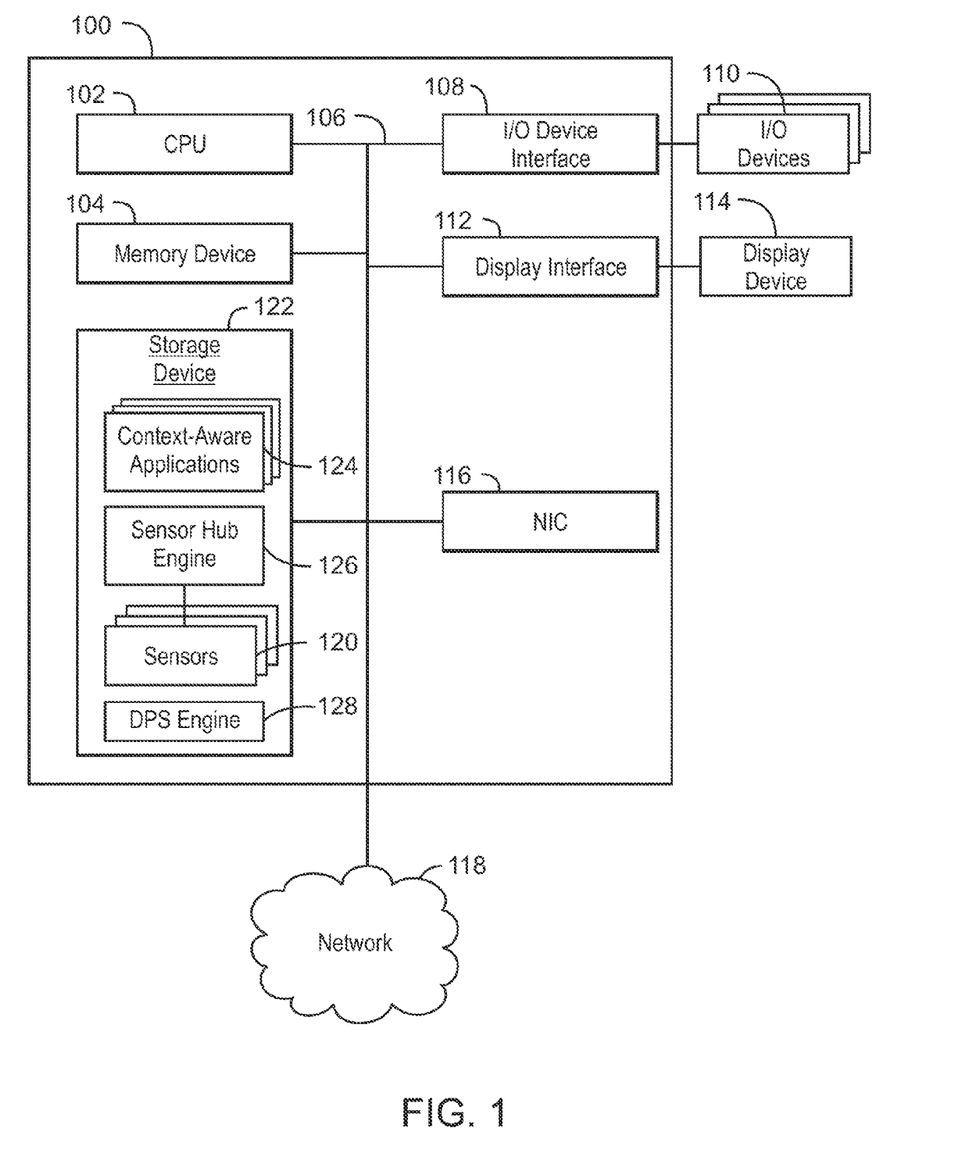
FIG. 1 is a block diagram of a computing device that may be used in accordance with embodiments.

FIG. 1 is a block diagram of a computing device 100 that may be used in accordance with embodiments. The computing device 100 may be a mobile computing device, such as a mobile phone, for example. In such embodiments, the computing device 100 may be implemented as a system-on-a-chip (SOC). The computing device 100 may also be any other suitable type of computing device, such as a laptop computer, desktop computer, tablet computer, mobile device, or server, among others. The computing device 100 may include a central processing unit (CPU) 102 that is configured to execute stored instructions, as well as a memory device 104 that stores instructions that are executable by the CPU 102. The CPU 102 may be coupled to the memory device 104 by a bus 106. Additionally, the CPU 102 can be a single core processor, a multi-core processor, a computing cluster, or any number of other configurations. Furthermore, the computing device 100 may include more than one CPU 102. The instructions that are executed by the CPU 102 may be used to direct context sensing procedures for the computing device 100.

The memory device 104 can include random access memory (RAM), read only memory (ROM), flash memory, or any other suitable memory systems. For example, the memory device 104 may include dynamic random access memory (DRAM).

The CPU 102 may be connected through the bus 106 to an input/output (I/O) device interface 108 configured to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The CPU 102 may also be linked through the bus 106 to a display interface 112 configured to connect the computing device 100 to a display device 114. The display device 114 may include a display screen that is a built-in component of the computing device 100. The display device 114 may also include a computer monitor, television, or projector, among others, that is externally connected to the computing device 100.

The computing device 100 may also include a network interface controller (NIC) 116. The NIC 116 may be configured to connect the computing device 100 through the bus 106 to a network 118. The network 118 may be a wide area network (WAN), local area network (LAN), or the Internet, among others.

The computing device 100 may also include one or more sensors 120. The sensors 120 may include, for example, a light sensor, barometer, proximity sensor, magnetometer, gyroscope, accelerometer, or microphone, among others. In various embodiments, the sensors 120 are built-in components of the computing device 100. However, in some embodiments, some of the sensors 120 are components that are externally connected to the computing device 100.

The computing device may also include a storage device 122. The storage device 122 is a physical memory such as a hard drive, an optical drive, a thumbdrive, an array of drives, or any combinations thereof. The storage device 122 may also include remote storage drives. The storage device 122 may include any number of context-aware applications 124 that are configured to run on the computing device 100.

In addition, the storage device 122 may include a sensor hub engine 126 and a digital signal processing (DSP) engine 128. The sensor hub engine 126 and the DSP engine 128 may be configured to offload the context sensing procedure from the CPU 102 of the computing device 100 and to direct the context sensing procedure based on a context based trigger mechanism, as discussed further below. The context sensing procedure may be offloaded to the sensor hub engine 126 from the CPU 102 by coupling the sensors 120 directly to the sensor hub engine 126 instead of the CPU 102, as shown in FIG. 1. Moreover, in some embodiments, the any of the sensors 120 may be directly coupled to the DSP engine 128 instead of the sensor hub engine 126.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
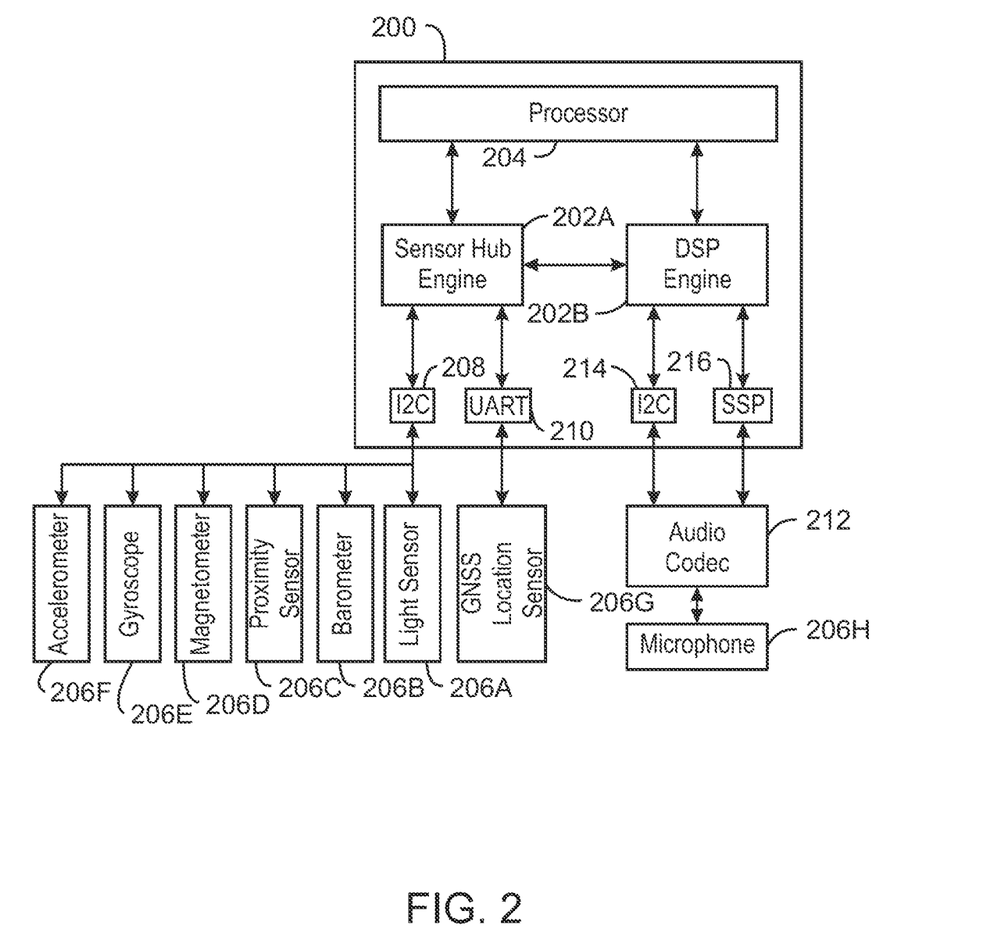
FIG. 2 is a block diagram of a system-on-a-chip (SOC) including several offload engines that are configured to direct a context sensing procedure, in accordance with embodiments.

FIG. 2 is a block diagram of a system-on-a-chip (SOC) 200 including several offload engines 202A-B that are configured to direct a context sensing procedure, in accordance with embodiments. The SOC 200 is implemented within a computing device, such as the computing device 100 discussed with respect to FIG. 1. In various embodiments, the computing device is a mobile computing device.

The SOC 200 may include a processor 204, which may be configured to provide context information obtained during execution of the context sensing procedure to any number of context-aware applications (not shown) running on the computing device. The SOC 202 may also include the offload engines 202A-B. More specifically, the SOC 200 may include a sensor hub engine 202A and a DSP engine 202B. The sensor hub engine 202A may include a context based trigger mechanism for directing the context sensing procedure and a number of classifiers to classify the context data obtained during the context sensing procedure, as discussed with respect to FIG. 3. The SOC 200 may also include a DSP engine 202B, which may interact with the sensor hub engine 202A and aid in the direction of an audio context sensing procedure.

The sensor hub engine 202A may be coupled to a number of sensors 206A-G, including, for example, a light sensor 206A, a barometer 206B, a proximity sensor 206C, a magnetometer 206D, a gyroscope 206E, an accelerometer 206F, and a global navigation satellite system (GNSS) location sensor 206G. The sensor hub engine 202A may be coupled to the light sensor 206A, the barometer 206B, the proximity sensor 206C, the magnetometer 206D, the gyroscope 206E, and the accelerometer 206F via an inter-integrated circuit (I2C) 208. The sensor hub engine 202A may be coupled to the GNSS location sensor 206G via a universal asynchronous receiver/transmitter (UART) 210.

The DSP engine 202B may be indirectly coupled to an audio sensor, such as a microphone 206H. Specifically, the microphone 206H may be coupled to an audio coder/decoder (codec) 212, and the audio codec 212 may be coupled to the DSP engine 202B via an I2C 214 and a synchronous serial port (SSP) 216.

Thus, in various embodiments, the sensors 206A-H are connected to the sensor hub engine 202A or the DSP engine 202B instead of being directly connected to the processor 204. This may allow for a reduction in the amount of power consumed by the computing device, since the context sensing procedure is offloaded from the processor 204 to the sensor hub engine 202A and the DSP engine 202B.

The sensor hub engine 202A may receive context data from the light sensor 206A, the barometer 206B, the proximity sensor 206C, the magnetometer 206D, the gyroscope 206E, or the accelerometer 206F, or any combinations thereof. In addition, the DSP engine 202B may receive audio context data from the microphone 206H. The sensor hub engine 202A and the DSP engine 202B may analyze such context data to determine context information corresponding to the computing device. The sensor hub engine 202A and the DSP engine 202B may then send the context information to the processor 204, which may forward the context information to any number of context-aware applications that have requested such context information. Further, in some embodiments, the sensor hub engine 202A and the DSP engine 202B may send the context information directly to the context-aware applications.

The block diagram of FIG. 2 is not intended to indicate that the SOC 200 is to include all of the components shown in FIG. 2. Further, the SOC 200 may include any number of additional components not shown in FIG. 2, depending on the details of the specific implementation.

Figure 3:
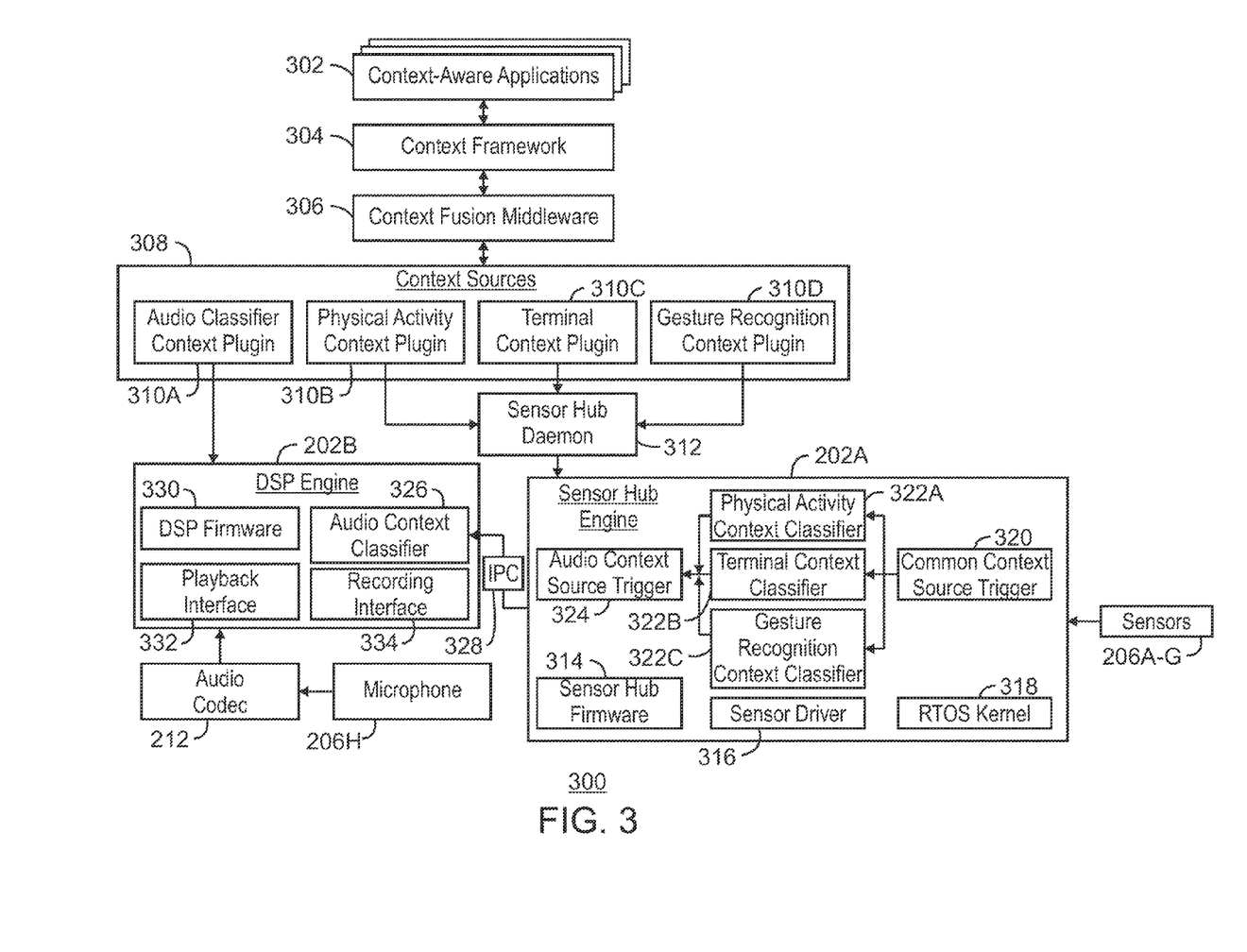
FIG. 3 is a block diagram of a context sensing system, in accordance with embodiments.

FIG. 3 is a block diagram of a context sensing system 300, in accordance with embodiments. Like numbered items are as described with respect to FIG. 2. The context sensing system 300 may include a number of context-aware applications 302. The context-aware applications 302 may include applications running on the computing device that utilize context information corresponding to the computing device or an environment of the computing device. A context-aware application 302 may rely on such context information for proper functioning at all times, or may only request such context information periodically, for example.

The context sensing system 300 may also include a context framework 304. The context framework 304 may be configured to determine the context-aware applications 302 that are to be included within the context sensing procedure. Specifically, the context framework 304 may specify which applications are to be allowed to receive context information, as well as the type of context information that may be received by each context-aware application 302. The context framework 304 may also specify the types of plugins that may be used during the context sensing procedure, as discussed further below.

Furthermore, the context framework 304 may include a database of historical context information. The historical context information may be used for the context sensing procedure in order to determine changes in the context or environment of the computing device based on previous context changes. For example, the historical context information may include physical activity data obtained via the accelerometer 206F that indicate the user has sat down. Moreover, information from other sensors may be used in conjunction with the physical activity data to determine the position of the user.

In various embodiments, the context sensing system 300 includes context fusion middleware 306. The context fusion middleware 306 may combine all of the context information that is obtained via the sensors 206A-H. The context fusion middleware 306 may then determine a suitable trigger interval for the context based trigger mechanism based on the combine context information, as discussed further below. Furthermore, the context fusion middleware 308 may send the combined context information to the context framework 304 to be stored and/or sent to any of the context-aware applications 302.

The context sensing system 300 may also include a number of context sources 308. The context sources 308 include plugins that are configured to gather the sensor information obtained via the sensors 206A-H from the sensor hub engine 202A and the DSP engine 202B. For example, the context sources 308 may include an audio classifier context plugin 310A that is configured to gather audio context information from the DSP engine 202B. In addition, the context sources 308 may include a physical activity context plugin 310B, a terminal context plugin 310C, and a gesture recognition context plugin 310D that are configured to gather physical activity context information, terminal context information, and gesture recognition context information, respectively, from the sensor hub engine 202A.

The physical activity context information includes context data from any sensor 206A-G that can be used to determine the context of any physical activity. Accordingly, an accelerometer 206F can be used to determine physical acceleration while the gyroscope 206E can be used to determine the orientation of the computing device. Moreover, a proximity sensor 206C can be used to determine the physical proximity of the device to other objects.

The terminal context information includes information relating to the status of the device, such as, for example, whether the device is face up, face down, portrait up, portrait down, landscape up, or landscape down. In some embodiments, the terminal context information is sensed using three-axis acceleration data. Additionally, the gesture recognition context information includes motion gestures. For example, device left/right/up/down flick once and left/right flick twice motion gestures may be used to control certain application behaviors, such as media playback, slide show, or device unlock, for example. In addition, ear touch or ear touch back motion gestures may be used for incoming call receiving and hang-up. In some embodiments, the gesture recognition information is sensed using accelerometer and/or gyroscope sensor data.

In some embodiments, the physical activity context plugin 310B, the terminal context plugin 310C, and the gesture recognition context plugin 310D are coupled to the sensor hub engine 202A via a sensor hub daemon 312. The sensor hub daemon 312 may be configured to handle and direct multiple simultaneous requests for context information received from the physical activity context plugin 310B, the terminal context plugin 310C, and the gesture recognition context plugin 310D. In various embodiments, the sensor hub daemon 312 is configured to report information relating to the context sensing procedure to the main processor of the computing device.

The sensor hub engine 202A may include a number of components, including sensor hub firmware 314, sensor drivers 316, and a real-time operating system (RTOS) kernel 318. The sensor hub engine 202A may also include a number of components for implementing the context sensing procedure. For example, the sensor hub engine 202A may include a common context source trigger 320. The common context source trigger 320 may be configured to set a sampling rate of any of the sensors 206A-G. Additionally, the common context source trigger 320 may send context data to a number of classifiers 322A-C at specified trigger points, or a specified trigger interval. The specified trigger points may occur when sensor data obtained via the sensor 206A-G exceed a predetermined threshold. The common context source trigger 320 may provide for pre-processing and triggering of the context sensing algorithms within the classifiers 322A-C.

The classifiers 322A-C, include a physical activity context classifier 322A, a terminal context classifier 322B, and a gesture recognition context classifier 322C. Each classifier 322A-C may be configured to execute a context sensing algorithm corresponding to one or more of the sensors 206A-G. Accordingly, each context algorithm may analyze context data from any combination of sensors 206A-G. For example, the physical activity context classifier 322A may be configured to execute a context sensing algorithm for analyzing context data obtained via the accelerometer 206F. As another example, the gesture recognition context classifier 322C may be configured to execute a context sensing algorithm for analyzing context data obtained via the accelerometer 206F and the gyroscope 206E. Based on the analysis of such context data, the classifiers 322A-C may determine context information relating to the computing device. The determined context information may then be sent to a corresponding plugin 310B-D.

In various embodiments, the sensor hub engine 202A also includes an audio context source trigger 324. The audio context source trigger 324 may provide for pre-processing and triggering of the audio context sensing algorithm. The audio context source trigger 324 may include a trigger level table. The trigger level table may be used to determine trigger points, or a trigger interval, for the audio context sensing procedure. The trigger points may be determined based on, for example, historical audio classifier results, physical activity result of the person who holds the computing device, the current time, the location of the computing device, the velocity of the computing device, and/or the battery level of the computing device. In addition, the audio context source trigger 324 may rely on context information determined by the physical activity context classifier 322A, the terminal context classifier 322B, or the gesture recognition context classifier 322C, or any combinations thereof. The audio context source trigger 324 may also include a feedback mechanism that allows for the adjustment of the trigger points based on changing conditions.

The audio context source trigger 324 of the sensor hub engine 202A may communicate with an audio context classifier 326 of the DSP engine 202B via an inter-process communication (IPC) 328. Based on a trigger received from the audio context source trigger 324, the audio context classifier 326 may be configured to execute a context sensing algorithm for analyzing audio context data obtained from the microphone 206H. The audio context classifier 326 may initiate the context sensing algorithm in response to input form the audio context source trigger 324, for example. Based on the analysis of such audio context data, the audio context classifier 326 may determine audio context information relating to the computing device. For example, the audio context classifier 326 may use captured audio pulse-code modulation (PCM) data to classify the audio context of the computing device, such as the speech, music, crowd, quiet, mechanical sound, or motion sound within the environment of the computing device. The determined audio context information may then be sent to the audio classifier context plugin 310A.

In some embodiments, the DSP engine 202B also includes a number of components, such as DSP firmware 330, a playback interface 332, and a recording interface 334. However, in some cases, the playback interface 332 may not be included within the DSP engine 202B.

Further, in some embodiments, the physical activity context classifier 322A, terminal context classifier 322B, gesture recognition context classifier 322D, and audio context classifier 326 are configured to distinguish meaningful context data from meaningless context data. The classifiers 322A-D and 326 may then discard the meaningless context data, and determine the context information for the computing device based only on the meaningful context data.

The block diagram of FIG. 3 is not intended to indicate that the context sensing system 300 is to include all of the components shown in FIG. 3. Further, the context sensing system 300 may include any number of additional components not shown in FIG. 3, depending on the details of the specific implementation. The context sensing system 300 may also include a different arrangement. For example, the microphone 206H may also directly communicate with the DSP engine 202B.

In some embodiments, the common context source trigger 320 operates according to the logic shown below.

```
S1: set physical sensor sample rate to a low number, i.e., 20 Hertz (Hz);
S2: detect movement based on accelerometer data;
if (movement exceeds specified upper bound threshold for certain times) {
    trigger the terminal context;
    set the accelerometer sample rate to 100 Hz;
    trigger the physical activity context;
    if (gesture context is registered) {
        set gyroscope sample rate to 100 Hz;
        trigger the gesture recognition context;
    }
} else if (movement is below specified lower bound threshold for certain times) {
    set the accelerometer sample rate to 20 Hz;
    if (gyroscope is on) {
        turn off gyroscope;
    }
    go to S1;
} else {
    go to S2;
}
```

Further, in some embodiments, the audio context source trigger 324 operates according to the logic shown below.

S1: Once the audio context trigger hits in the sensor hub engine, the audio context trigger sends an IPC to wake up the DSP engine to initiate audio context classifier;

S2: Determine the next trigger level L by considering the following conditions:
(1) Time, to determine whether it is night;
(2) Battery, to determine whether it is crucial;
(3) Check the last stored results for the physical activity context classifier and the terminal context classifier by comparing the timestamp. If the results are older than a specified limit, refresh the physical activity context classifier and the terminal context classifier, and obtain the results;
(4) Based on time, battery, terminal, and activity, determine the next trigger level L;

S3: Check the historical audio context classifier result and adjust the next trigger level as L'

However, it is to be understood that the common context source trigger 320 and the audio context source trigger 324 may operate according to any number of variations of the above logic, depending on the details of the specific implementation.

Figure 4:
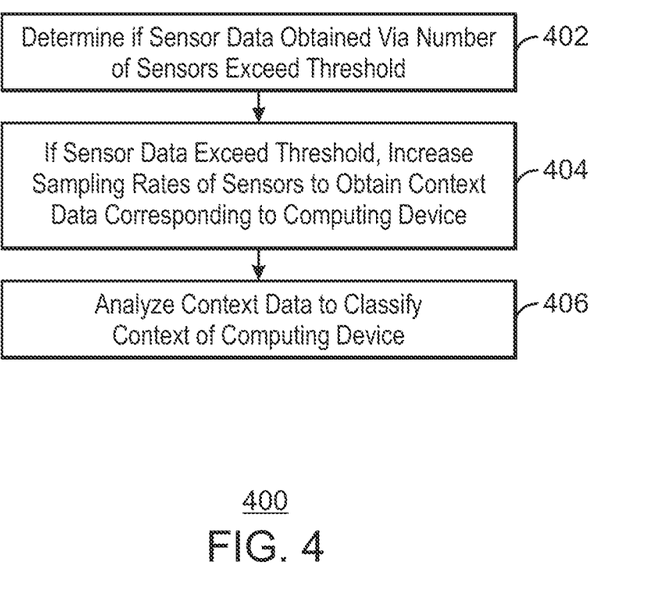
FIG. 4 is a process flow diagram showing a method for providing context sensing for a computing device, in accordance with embodiments.

FIG. 4 is a process flow diagram showing a method 400 for providing context sensing for a computing device, in accordance with embodiments. The method 400 may provide for the determination of the context and/or the environment of a computing device, which may be requested by any number of context-aware applications running on the computing device. In various embodiments, the method 400 is implemented within a computing device, such as the computing device 100 discussed with respect to FIG. 1. The method 400 may be implemented within a computing device that includes a context sensing system, such as the context sensing system 300 discussed with respect to FIG. 3.

The method begins at block 402, at which it is determined if sensor data obtained via a number of sensors exceed a threshold. A threshold may be pre-determined as discussed above. When the threshold has been exceeded, the specified trigger points may be adjusted according to the details of the specific implementation, as discussed further below. The sensors may include, for example, a light sensor, barometer, proximity sensor, magnetometer, gyroscope, accelerometer, or audio sensor, such as a microphone.

At block 404, if the sensor data exceed the threshold, the sampling rates of the sensors are increased to obtain context data corresponding to the computing device. The context data may be collected for a specified period of time before the sampling rates of the sensors are reduced. The period of time for collecting the context data may be adjusted based at least in part on the power level and power consumption of the computing device.

In some embodiments, the sampling rates of a number of common context sensors are increased via a common context source trigger of the context sensing system when the sensor data obtained from the common context sensors exceed the threshold. Further, in some embodiments, the sampling rate of an audio sensor is increased via an audio classifier trigger of the context sensing system when the sensor data obtained from the audio sensor exceed the threshold.

In various embodiments, the sensors of the computing device may be continuously running at a very low power state. For example, the microphone may periodically collect audio sensor data until a noise that exceeds the threshold specified by the trigger interval is recorded, at which point the sampling rate of the microphone is increased.

At block 406, the context data are analyzed to classify a context of the computing device, or to determine context information relating to the computing device. The context may be provided to a processor of the computing device, and the processor may send the context to any of a number of context-aware applications. Further, the context data may be analyzed to determine changes in the environment of the computing device, and the processor may be notified of the changes in the environment. In some embodiments, the processor may perform any number of suitable actions based on the context or the environment of the computing device.

In various embodiments, the context data are analyzed to determine meaningful context data and meaningless context data. The meaningful context data may be any context data that has been designated as being of interest, and may vary depending on the specific computing device or specific implementation of the computing device, as discussed above. Context data that has not been designated as being of interest may be identified as meaningless context data. The meaningless context data may be discarded, and only the meaningful context data may be analyzed to classify the context of the computing device.

Further, in various embodiments, a fusion algorithm may be used to combine all the context data obtained from the sensors. The combined context data may then be analyzed to determine suitable trigger points, or a suitable trigger interval, for the context sensing procedure. The determined trigger interval may correspond to a specific threshold for increasing the sampling rate of the sensors. In some embodiments, the power consumption of the computing device may be taken into account when determining the trigger interval.

For example, if the power consumption of the computing device exceeds a specified threshold, the trigger level and, thus, the threshold may be increased. This may allow for a reduction in the power consumption of the computing device, since the sampling rates of the sensors are not increased as often. Moreover, in some embodiments, if the power level of the computing device drops below a specified lower threshold, the sampling rates of the sensors may be decreased, and the context sensing procedure may be temporarily disabled to conserve power.

Further, in some embodiments, the trigger intervals may be adjusted based on the context of the computing device. For example, if it is determined that the computing device is in a moving vehicle, the trigger interval and, thus, the threshold for obtaining audio context data may be increased such that the microphone is only activated by very loud noises.

The process flow diagram of FIG. 4 is not intended to indicate that the blocks of method 400 are to be executed in any particular order, or that all of the blocks are to be included in every case. Further, any number of additional blocks may be included within the method 400, depending on the details of the specific implementation.

Figure 5:
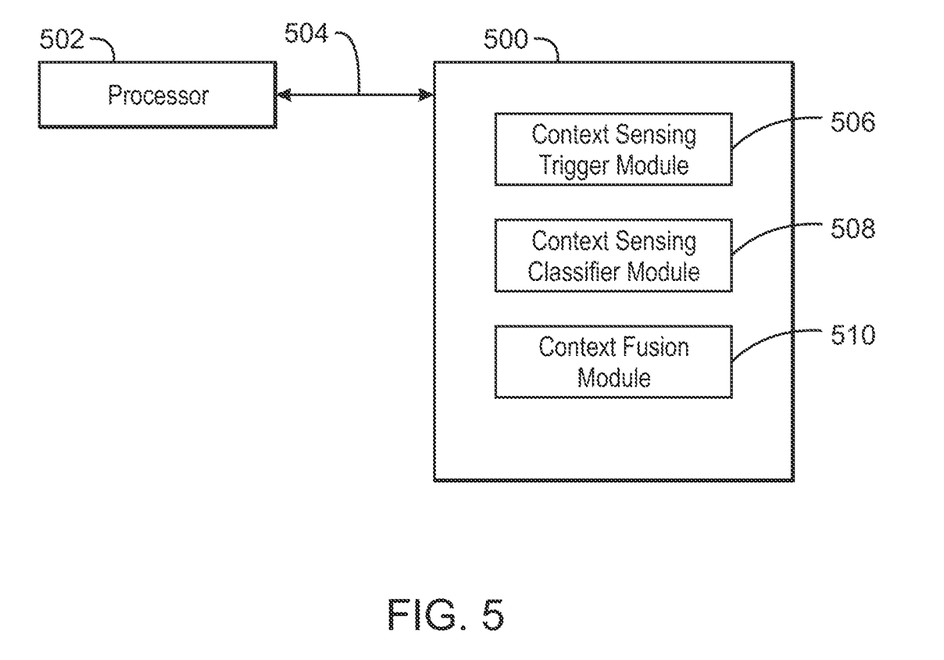
FIG. 5 is a block diagram showing tangible, non-transitory computer-readable media that store code for context sensing, in accordance with embodiments.

FIG. 5 is a block diagram showing tangible, non-transitory computer-readable media 500 that store code for context sensing, in accordance with embodiments. The tangible, non-transitory computer-readable media 500 may be accessed by a processor 502 over a computer bus 504. Furthermore, the tangible, non-transitory computer-readable media 500 may include code configured to direct the processor 502 to perform the techniques described herein.

The various software components discussed herein may be stored on the tangible, non-transitory computer-readable media 500, as indicated in FIG. 5. For example, a context sensing trigger module 506 may be configured to determine if sensor data obtained from any number of sensors exceed a threshold that is defined based on a specified trigger interval. If the sensor data exceed the threshold, the context sensing trigger module 506 may be configured to increase the sampling rate of the sensors to obtain context data. A context sensing classifier module 508 may be configured to analyze the context data obtained from the sensors to classify the context represented by the context data. In addition, a context fusion module 510 may be configured to analyze context data obtained from any number of sensors to determine a trigger interval and a corresponding threshold for the context sensing trigger module 506.

The block diagram of FIG. 5 is not intended to indicate that the tangible, non-transitory computer-readable media 500 are to include all of the components shown in FIG. 5. Further, the tangible, non-transitory computer-readable media 500 may include any number of additional components not shown in FIG. 5, depending on the details of the specific implementation.

EXAMPLE 1

A method for context sensing is described herein. The method includes determining if sensor data obtained via a number of sensors exceed a predetermined threshold and, if the sensor data exceed the threshold, increasing a sampling rate of any of the sensors to obtain context data corresponding to a computing device. The method also includes analyzing the context data to classify a context of the computing device.

The method may include providing the context to a processor of the computing device, wherein the processor is configured to send the context to any of a number of context-aware applications. The method may also include analyzing the context data to determine changes in an environment of the computing device and notifying a processor of the computing device of the changes in the environment. Furthermore, the method may include analyzing the context data to determine meaningful context data and meaningless context data, discarding the meaningless context data, and analyzing the meaningful context data to classify the context of the computing device.

The method may include combining the context data obtained via the sensors and analyzing the combined context data to determine the threshold. The method may also include determining a power level of the computing device and lowering the sample rate of the sensors if the power level is below a specified lower threshold. In some embodiments, the method includes increasing a sampling rate of a number of common context sensors via a common context source trigger of the context sensing system when sensor data obtained from the common context sensors exceed the threshold. In addition, in some embodiments, the method includes increasing the sampling rate of an audio sensor via an audio classifier trigger of the context sensing system when sensor data obtained from the audio sensor exceed the threshold.

EXAMPLE 2

A computing device is described herein. The computing device includes a context sensing system that is configured to increase a sampling rate of a number of sensors when sensor data obtained via the sensors exceed a threshold and obtain context data corresponding to the computing device via the sensors. The context sensing system is also configured to analyze the context data to determine context information corresponding to the computing device and send the context information to a central processing unit (CPU) of the computing device. The central processing unit (CPU) is configured to accept the context information from the context sensing system and send the context information to a context-aware application.

The context sensing system may also be configured to analyze the context data to determine changes in an environment of the computing device and notify the CPU of the changes in the environment. A common context source trigger of the context sensing system may be configured to increase a sampling rate of a number of common context sensors when sensor data obtained from the common context sensors exceed the threshold. An audio classifier trigger of the context sensing system may be configured to increase a sampling rate of an audio context sensor when sensor data obtained from the audio context sensor exceed the threshold.

In some embodiments, the context sensing system is configured to combine the context data from the sensors and analyze the combined context data to determine the threshold for increasing the sampling rate of the sensors. Further, in some embodiments, the context sensing system is configured to analyze the context data to determine meaningful context data and meaningless context data, discard the meaningless context data, and analyze the meaningful context data to determine the context information corresponding to the computing device.

The context sensing system may be configured to determine a power level of the computing device and decrease the sampling rate of the sensors if the power level is below a specified lower threshold. The context sensing system may also be configured to determine the threshold based on a power consumption of the computing device and increase the threshold if the power consumption exceeds a specified upper threshold. In addition, the context sensing system may be configured to receive a request for context information from a context-aware application via the CPU, determine the context information, and return the context information to the CPU. The CPU is configured to send the context information to the context-aware application.

EXAMPLE 3

At least one machine readable medium is described herein. The at least one machine readable medium has instructions stored therein that, in response to being executed on a computing device, cause the computing device to increase a sampling rate of a number of sensors when sensor data obtained via the sensors exceed a threshold, obtain context data corresponding to the computing device via the sensors, and analyze the context data to classify a context of the computing device.

The instructions also cause the computing device to send the context to a central processing unit (CPU) of the computing device, wherein the CPU is configured to send the context to any of a number of context-aware applications running on the CPU. Further, in some embodiments, the threshold is determined based on a power consumption of the computing device, and the threshold is increased if the power consumption of the computing device exceeds a specified upper threshold.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for context sensing, comprising:
   determining if sensor data obtained via a plurality of sensors exceed a predetermined threshold;
   if the sensor data exceed the threshold, increasing a sampling rate of any of the plurality of sensors to obtain context data corresponding to a computing device;
   analyzing the context data to classify a context of the computing device;
   analyzing the context data to determine meaningful context data and meaningless context data;
   discarding the meaningless context data; and
   analyzing the meaningful context data to classify the context of the computing device via an offload engine.

2. The method of claim 1, comprising providing the context to a processor of the computing device, wherein the processor is configured to send the context to any of a plurality of context-aware applications.

3. The method of claim 1, comprising:
analyzing the context data to determine changes in an environment of the computing device; and
notifying a processor of the computing device of the changes in the environment.

4. The method of claim 1, comprising:
combining the context data obtained via the plurality of sensors; and
analyzing the combined context data to determine the threshold.

5. The method of claim 1, comprising:
determining a power level of the computing device; and
lowering the sample rate of the plurality of sensors if the power level is below a specified lower threshold.

6. The method of claim 1, comprising increasing a sampling rate of a plurality of common context sensors via a common context source trigger of a context sensing system when sensor data obtained from the plurality of common context sensors exceed the threshold.

7. The method of claim 1, comprising increasing the sampling rate of an audio sensor via an audio classifier trigger of a context sensing system when sensor data obtained from the audio sensor exceed the threshold.

8. A computing device, comprising:
a context sensing system configured to:
increase a sampling rate of a plurality of sensors when sensor data obtained via the plurality of sensors exceed a threshold;
obtain context data corresponding to the computing device via the plurality of sensors;
analyze the context data to determine context information corresponding to the computing device and to determine meaningful context data and meaningless context data;
discard the meaningless context data; and
analyze the meaningful context data to determine the context information corresponding to the computing device via an offload engine;
send the context information to a central processing unit (CPU) of the computing device; and
the central processing unit (CPU) configured to:
accept the context information from the context sensing system; and
send the context information to a context-aware application.

9. The computing device of claim 8, wherein the context sensing system is configured to:
analyze the context data to determine changes in an environment of the computing device; and
notify the CPU of the changes in the environment.

10. The computing device of claim 8, wherein a common context source trigger of the context sensing system is configured to increase a sampling rate of a plurality of common context sensors when sensor data obtained from the plurality of common context sensors exceed the threshold.

11. The computing device of claim 8, wherein an audio classifier trigger of the context sensing system is configured to increase a sampling rate of an audio context sensor when sensor data obtained from the audio context sensor exceed the threshold.

12. The computing device of claim 8, wherein the context sensing system is configured to:
combine the context data from the plurality of sensors; and
analyze the combined context data to determine the threshold for increasing the sampling rate of the plurality of sensors.

13. The computing device of claim 8, wherein the context sensing system is configured to:
determine a power level of the computing device; and
decrease the sampling rate of the plurality of sensors if the power level is below a specified lower threshold.

14. The computing device of claim 8, wherein the context sensing system is configured to:
determine the threshold based on a power consumption of the computing device; and
increase the threshold if the power consumption exceeds a specified upper threshold.

15. The computing device of claim 8, wherein the context sensing system is configured to:
receive a request for context information from a context-aware application via the CPU;
determine the context information; and
return the context information to the CPU; and
wherein the CPU is configured to send the context information to the context-aware application.

16. At least one non-transitory machine readable medium having instructions stored therein that, in response to being executed on a computing device, cause the computing device to:
increase a sampling rate of a plurality of sensors when sensor data obtained via the plurality of sensors exceed a threshold;
obtain context data corresponding to the computing device via the plurality of sensors;
analyze the context data to classify a context of the computing device;
analyzing the context data to determine meaningful context data and meaningless context data;
discarding the meaningless context data; and
analyzing the meaningful context data to classify the context of the computing via an offload engine.

17. The at least one non-transitory machine readable medium of claim 16, wherein the instructions cause the computing device to send the context to a central processing unit (CPU) of the computing device, and wherein the CPU is configured to send the context to any of a plurality of context-aware applications running on the CPU.

18. The at least one non-transitory machine readable medium of claim 16, wherein the threshold is determined based on a power consumption of the computing device, and wherein the threshold is increased if the power consumption of the computing device exceeds a specified upper threshold.

* * * * *